July 31, 1956     E. P. TURNER ET AL     2,757,299

ALIGNMENT ADJUSTMENT DEVICES FOR DRAG CUP MOTORS

Filed June 14, 1955

WITNESS

*William Martins*

INVENTORS
Edgar P. Turner
and Norris H. Sailer

BY *J. E. Stanford*

ATTORNEY

United States Patent Office 2,757,299
Patented July 31, 1956

2,757,299

ALIGNMENT ADJUSTMENT DEVICES FOR DRAG CUP MOTORS

Edgar P. Turner, Watchung, and Norris H. Sailer, Union, N. J., assignors to The Singer Manufacturing Company, Elizabeth, N. J., a corporation of New Jersey Application June 14, 1955, Serial No. 515,509

5 Claims. (Cl. 310—266)

This invention relates to dynamoelectric machines and more particularly to electrical signal generators and sensitive torque motors having cup-shaped rotors.

In devices of this type, the air-gap is annular, and radially very small, being usually of the order of one-half inch or less. It is difficult properly to align the cup rotor in such a gap where radial clearances are only a few thousandths of an inch.

The rotor is usually rather long for its diameter, and, being supported at one end only, the fit of the parts must be very accurate to minimize runout at the opposite or unsupported end, and to prevent interference in the gap.

It is a primary object of this invention, therefore, to provide means for adjusting the alignment of the rotor in the air-gap of motors having cup-type rotors, which means shall be simple and effective as a regular production assembly step.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 1:
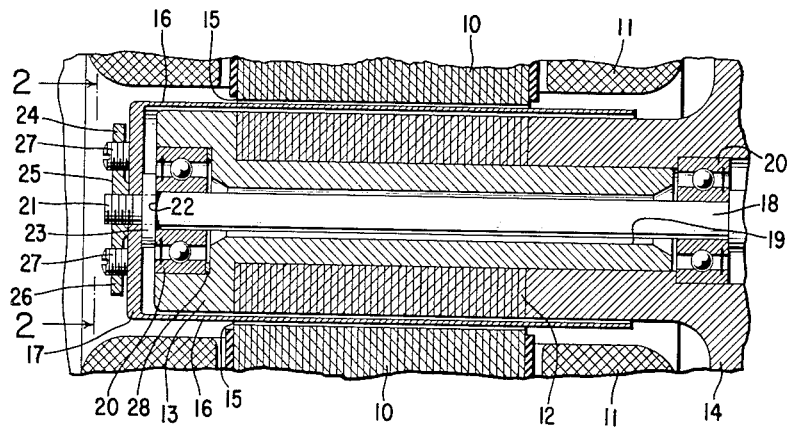
Fig. 1 is a longitudinal sectional detail taken partially through a motor embodying the invention.

Referring now to Fig. 1, 10 denotes an outer stator core of magnetic material carrying a winding 11. An inner magnetic core 12 carried by a supporting quill 13 held in the stator frame 14 forms with the outer core 10 an annular air-gap 15. Located in the air-gap 15 is the peripheral portion 16 of a cup-shaped rotor formed at one end with a head portion 17 and having its other end open.

A shaft 18 passes freely through the bore 19 of the quill 13 and is journaled in anti-friction bearings 20—20 as shown. The shaft 18 is formed with a threaded end portion 21 of reduced diameter forming a shoulder 22. A spacing shim 23 is placed on the end portion 21 and against the shoulder 22. The head portion 17 of the rotor is apertured to receive the end portion 21 and is secured thereon against the shim 23 by a nut 24 threaded onto the end 21 of the shaft 18.

Figure 2:
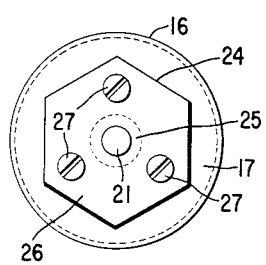
Fig. 2 is an end elevational view taken on the line 2—2 of Fig. 1.

The nut 24 is formed with a central portion 25 which is thicker than the outer portion 26 which has been undercut to provide spacing between the nut and the head 17 of the rotor. Threaded into this outer portion 26 of the nut are three adjusting screws 27, equally spaced circumferentially, as seen best in Fig. 2. The screws 27 reach through the nut 24 and contact the head portion 17 of the rotor. Shims 28 are provided for end-play adjustment.

It will be seen that the nut 24, which is made preferably of stainless steel, is taken up tightly on the shaft end 21 and is held rigid relative to the axis of the shaft 18. The pressures applied by the screws 27 to the rotor head 17 cause selective bending of the rotor which is made of aluminum or copper and is supported essentially as a cantilever. In this manner the runout of the rotor at the open end, which is checked on a test fixture, may be readily corrected by proper manipulation of the screws 27 which apply the necessary bending stresses. It is essential that the head portion 17 be provided with freedom or clearance in which to bend, which explains the need for the undercut portion 26 of the nut 24 and the spacing shim 23. After proper adjustment, the screws 27 may be locked in position by any suitable means but preferably by a light coating of bonding cement. This adjustment is somewhat similar to that normally employed in adjusting the leveling screws of a surveyor's transit and the knack may be easily acquired by semi-skilled labor after very brief instruction and practice.

Figure 3:
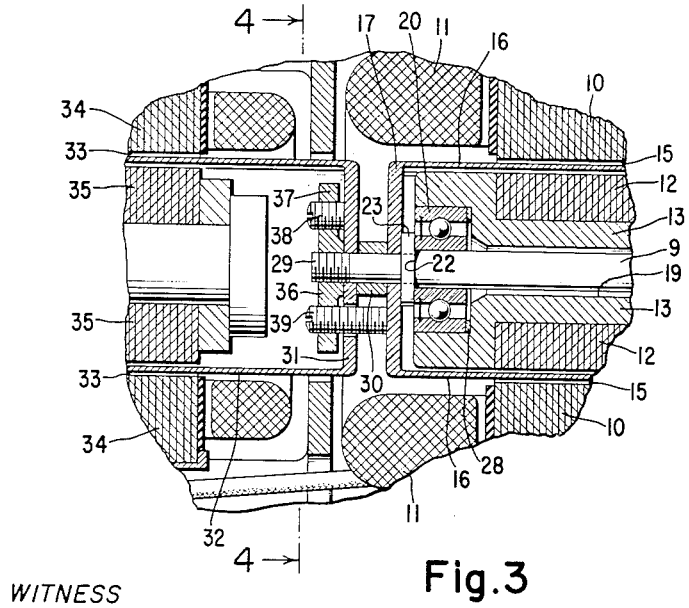
Fig. 3 is a longitudinal sectional detail taken partially through a motor showing a modification of the embodiment of Fig. 1.

Fig. 3 shows a modification of the above structure and is used in those cases where a single shaft supports two rotors, as, for example, when a motor and a tachometer generator are combined in a common housing. In this case, a shaft 9 is formed with a longer threaded end portion 29 of reduced diameter and carries, in addition to the elements of Fig. 1, a second spacing bushing 30 and the apertured head portion 31 of a second rotor having a peripheral portion 32 located in a second annular air-gap 33 formed between an outer stator core 34 and an inner stattor core 35 as shown.

The second rotor is placed in head-to-head relation with the first rotor and is secured on the shaft 9 by means of a nut 36 threaded onto the shaft end 29 so that both rotor heads and spacing shims are clamped together.

Figure 4:
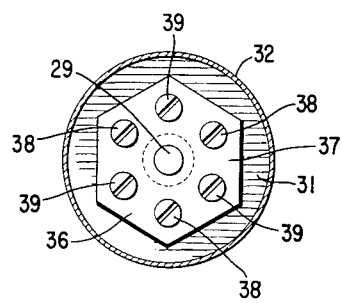
Fig. 4 is an end elevation, partly in section, taken on the line 4—4 of Fig. 3.

The nut 36 is formed with an outer undercut portion 37 which provides contact relief for the rotor head 31. Threaded into and through this outer portion 37 are three adjusting screws 38, spaced equally circumferentially, as seen best in Fig. 4. These screws are reached from within the open end (not shown) of the second rotor and make contact with the inner face of the rotor head 31 for exerting selective pressures thereon for aligning the rotor periphery 32 in the air-gap 33.

Alternately spaced on the same circumference with the screws 38 are longer screws 39 which are tapped into and through the nut 36, and reach through apertures in the rotor head 31 to contact the outer surface of the first rotor head 17. It is clear from the above that each rotor may be independently adjusted for air-gap alignment by selective manipulation of the screws 38 and 39 reached through the inside of the second rotor through the open end thereof. Again, when satisfactory alignment is secured, the screws 38 and 39 are locked by applying a bonding cement at the juncture between the nut and screw.

It is evident from the above that means have been provided according to this invention for effecting readily and accurately the alignment of cup-shaped rotors in annular air-gaps for instrument motors having one or two rotors on one shaft.

Numerous alternations of the structure herein disclosed will suggest themselves to those skilled in the art. However, it is to be understood that the present disclosure relates to preferred embodiments of the invention which are for the purpose of illustration only, and not to be Having thus set forth the nature of the invention, what we claim herein is:

1. In a dynamoelectric machine having an annular air-gap, a shaft formed with a threaded, reduced portion at one end providing a shoulder, a cup-shaped rotor positioned with its peripheral portion in said air-gap and formed with an apertured head portion received by said reduced portion of the shaft with the rotor positioned to surround the main body of the shaft, a spacing shim located between the shaft shoulder and the rotor head, a nut threaded onto the reduced portion of said shaft and having a central portion thicker than the outer portion, which thicker portion is drawn up against the rotor head to clamp it tightly against the spacing shim, the outer portion of said nut being formed with circumferentially spaced and threaded apertures, and adjusting screws received in said apertures to reach through said nut to contact the head of the rotor for centering the peripheral portion of the rotor in the air-gap by selective pressures exerted on the head by the screws.

2. In a dynamoelectric machine having an inner and an outer stator core member forming an annular air-gap, a shaft extending freely through the inner core member and having at one end an extended, reduced, threaded portion forming a shoulder, a cup-shaped rotor positioned to surround said inner core and having its peripheral portion located in said air-gap and formed at one end with an apertured head portion received on the reduced portion of the shaft, a spacing shim located between the shaft shoulder and the rotor head, a nut threaded onto the reduced portion of the shaft to clamp the rotor head against the spacing shim, the nut being formed with an outer portion of reduced thickness to relieve contact with the rotor head, and adjusting screws spaced circumferentially and threaded into said outer portion to reach through said nut to contact the head of the rotor to effect slight positional changes of the rotor with respect to the air-gap by selective manipulation of the screws.

3. In a dynamoelectric machine, rotor structure comprising a central shaft formed at one end with a threaded portion of reduced diameter providing a locating shoulder, a cup-shaped rotor having a radially thin, peripheral portion surrounding said shaft and an axially thicker head portion apertured to receive the reduced end portion of said shaft, a spacing shim located between the shaft shoulder and the rotor head, a nut threaded onto the reduced portion of the shaft to clamp the rotor head against the spacing shim, the nut being formed with an outer portion which is undercut to provide axial spacing from the rotor head, and circumferentially-spaced adjusting screws threaded through the undercut portion of said nut to reach and make contact with the rotor head to effect alignment of the axis of said rotor with the axis of said shaft by selective pressures exerted by the screws on the rotor head.

4. In a dynamoelectric machine having two annular air-gaps on a common axis but spaced apart axially, double rotor structure comprising a single shaft formed at one end with a threaded portion of reduced diameter providing a shoulder, a first cup-shaped rotor having a peripheral portion located in one of said air-gaps and surrounding said shaft, and a head portion apertured to receive the reduced portion of said shaft, a first spacing shim located between said shaft shoulder and said rotor head, a second spacing shim located on the opposite side of the rotor head from the first shim, a second cup-shaped rotor having a peripheral portion facing away from said first rotor and located in the other of said air-gaps, and a head portion centrally apertured to receive the reduced portion of said shaft, a nut threaded onto the reduced shaft portion to clamp the rotor heads and shims together and to the shaft, the nut being formed with an outer portion which is undercut to provide axial spacing from the second rotor head, first circumferentially spaced adjusting screws threaded through the undercut portion of said nut to contact the head of the second rotor and second adjusting screws spaced alternately with the first adjusting screws and threaded through said nut and passed freely through apertures in the head of the second rotor to contact the head of the first rotor to effect independent alignment of each rotor in its respective air-gap by selective manipulation of the screws.

5. In a dynamoelectric machine having an annular air-gap, a shaft formed with a threaded, reduced portion at one end providing a shoulder, a cup-shaped rotor positioned with its peripheral portion in said air-gap and formed with an apertured head portion received by said reduced portion of the shaft with the rotor positioned to surround the main body of the shaft, a nut threaded onto the reduced portion of said shaft to secure the rotor thereon, circumferentially spaced adjusting screws operatively related to the head portion of the rotor to effect slight positioned changes of the rotor with respect to the air-gap by selective manipulation of the screws.

No references cited.